United States Patent [19]

Hilfman

[11] 3,963,601

[45] June 15, 1976

[54] HYDROCRACKING OF HYDROCARBONS WITH A CATALYST COMPRISING AN ALUMINA-SILICA SUPPORT, A GROUP VIII METALLIC COMPONENT, A GROUP VI-B METALLIC COMPONENT AND A FLUORIDE

[75] Inventor: Lee Hilfman, Mount Prospect, Ill.

[73] Assignee: Universal Oil Products Company, Des Plaines, Ill.

[22] Filed: July 15, 1974

[21] Appl. No.: 488,348

Related U.S. Application Data

[62] Division of Ser. No. 390,146, Aug. 20, 1973, abandoned.

[52] U.S. Cl. .............................. 208/111; 252/442; 252/455 R; 260/672 T; 260/683.68
[51] Int. Cl.² .................. C10G 13/02; C10G 23/04
[58] Field of Search ........... 208/111, 115, 116, 117; 252/441, 442

[56] References Cited
UNITED STATES PATENTS

| | | | |
|---|---|---|---|
| 2,820,835 | 1/1958 | Peters et al. | 260/683.51 |
| 3,213,012 | 10/1965 | Kline et al. | 208/110 |
| 3,725,244 | 4/1973 | Schutt | 208/59 |
| 3,748,257 | 7/1973 | Larson et al. | 208/111 |
| 3,808,151 | 4/1974 | Yamazi et al. | 252/439 |
| 3,840,614 | 10/1974 | Kravitz et al. | 208/112 X |
| 3,840,615 | 10/1974 | Suggitt et al. | 208/112 X |
| 3,843,746 | 10/1974 | Kravitz et al. | 260/683.68 |
| 3,847,796 | 11/1974 | Hilfman et al. | 208/111 |

*Primary Examiner*—Delbert E. Gantz
*Assistant Examiner*—G. E. Schmitkons
*Attorney, Agent, or Firm*—James R. Hoatson, Jr.; Thomas K. McBride; William H. Page, II

[57] ABSTRACT

Hydrocarbons are converted with a catalyst comprising an alumina-silica support, a Group VIII metallic component, a Group VI-B metallic component and a fluoride. Key feature of the process involves the preparation of the catalyst by initially impregnating the alumina-silica support with the Group VI-B and the Group VIII metallic components and by subsequently impregnating the previously impregnated composite with fluoride.

3 Claims, No Drawings

HYDROCRACKING OF HYDROCARBONS WITH A CATALYST COMPRISING AN ALUMINA-SILICA SUPPORT, A GROUP VIII METALLIC COMPONENT, A GROUP VI-B METALLIC COMPONENT AND A FLUORIDE

CROSS-REFERENCE TO RELATED APPLICATIONS

The present application is a division of my copending application, Ser. No. 390,146, filed Aug. 20, 1973, and now abandoned; all the teachings of which copending application are incorporated herein by specific reference thereto. This application is filed to comply with a requirement for restriction in my copending application, Ser. No. 390,146.

The subject of the present invention is a novel catalytic composite which has an exceptional activity when employed in hydrocarbon conversion processes that require a catalyst having a hydrorefining and hydrocracking capability. More particularly, the present invention relates to a novel catalyst composite containing a fluoride combined with an alumina-silica support, a Group VI-B metallic component and a Group VIII metallic component. This catalyst is characterized by its method of preparation inasmuch as it is an essential feature of the present invention that the catalyst is formed by preparing an alumina-silica base containing a Group VI-B metallic component and a Group VIII metallic component, and then subsequently incorporating a fluoride with the previously prepared composite. The catalyst so produced finds utility in the acceleration of hydrocarbon conversion reactions that respond to hydrorefining and hydrocracking catalysts. The catalyst prepared according to the present invention is particularly well suited for the production of jet fuel.

Solid catalysts having a propensity to accelerate hydrorefining and hydrocracking reactions are widely used today in many industries within the petroleum and chemical arts to accelerate a wide spectrum of hydrocarbon conversion reactions. In many applications these solid catalysts are used by themselves to accelerate reactions such as catalytic cracking, alkylation, dealkylation, polymerization, etc. In other applications these catalysts are combined with a hydrogenation-dehydrogenation metallic component to form a dual-function catalyst having both a hydrocracking function and a hydrogenation-dehydrogenation function. In this latter case, the cracking function is generally thought to be associated with a material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

Heretofore the hydrocracking function has been typically provided by a wide variety of materials such as alumina, silica-alumina, silica-magnesia, silica gels, phosphates, various types of amorphous clays, acid-treated alumina, and halogen-containing alumina.

The thrust of the present invention is grounded in a finding of a synergistic combination of an alumina-silica support, a Group VI-B metallic component, a Group VIII metallic component and a fluoride. In other words, I have now found a method for combining the above-mentioned components to produce a catalyst having a hydrocracking function which is substantially greater than catalysts containing the same elementary components and prepared by different techniques.

The catalyst composite formed by the method of the present invention can be used to accelerate a wide variety of hydrocarbon conversion reactions such as cracking, hydrocracking, isomerization, dehydrogenation, hydrogenation, desulfurization, cyclization alkylation, polymerization, dealkylation, transalkylation, hydroisomerization, etc.

In one embodiment, the present invention provides a method of preparing a hydrocarbon conversion catalyst comprising a fluoride combined with an alumina-silica support containing a Group VI-B metallic component and a Group VIII metallic component. The method comprises the steps of impregnating an alumina-silica support with a Group VI-B metallic component and a Group VIII metallic component and subsequently impregnating the previously impregnated composite with a fluoride.

Another embodiment relates to a hydrocarbon conversion catalyst described in the previous embodiment wherein the alumina-silica support contains from about 10 to about 90 weight percent alumina, the Group VI-B metallic component is molybdenum or a compound thereof and the Group VIII metallic component is nickel or a compound thereof.

Yet another embodiment is a process for the conversion of hydrocarbon which comprises contacting the hydrocarbon and hydrogen with the catalytic composite of the first embodiment at hydrocarbon conversion conditions.

Other objects and embodiments of the present invention relate to the details regarding the precise nature of the steps utilized in forming the catalyst, the preferred catalytic ingredients, the concentration of components in the catalyst, operating conditions for use in the hydrocarbon conversion processes, and the like particulars which are hereinafter given in the following detailed discussion of each of these facets of the present invention.

The alumina-silica support is an essential element of the catalyst of the present invention and is preferably a composite of alumina and silica with alumina being in the greater proportion. By way of specific examples, a satisfactory support or carrier material may comprise equimolar quantities of alumina and silica or 63 percent by weight of alumina and 37 percent by weight of silica. In general, the support comprises from about 10 weight percent to about 90 weight percent alumina. The support may be formed by any of the numerous techniques which are rather well defined in the prior art relating thereto. Such techniques include the acid-treating of a natural clay, sand or earth, co-precipitation or successive precipitation from hydrosols; these techniques are frequently coupled with one or more activating treatments including hot oil aging, steaming, drying, oxidizing, reducing, calcining, etc. The pore structure of the support or carrier commonly defined in terms of surface area, pore diameter and pore volume, may be developed to specified limits by any suitable means including aging the hydrosol and/or hydrogel under controlled acidic or basic conditions at ambient or elevated temperature, or by gelling the carrier at a critical pH or by treating the carrier with various inorganic or organic reagents. An adsorptive hydrogenation catalyst, adaptable for utilization in the process of the present invention, will have a surface area of about 50 to about 700 square meters per gram, a pore diameter of about 20 to about 300 Angstroms, a pore volume of about 0.10 to about 0.80 milliliter per gram, and, an apparent bulk density preferably within the range of from about 0.10 to about 0.30 gram/cc. It is understood that the precise physical and/or chemical characteristics of the carrier material are not considered to be limiting upon the scope of the present invention. The catalyst may, for example, exist in the form of pills, pellets, granules, broken fragments, spheres, or various special shapes, disposed as a fixed bed within a reaction zone, and the charge stock may be passed therethrough in the liquid, vapor or mixed phase, and in either upward or downward flow. Alternatively, the catalyst may be prepared in a suitable form for use in moving bed reaction zones, in which the hydrocarbon charge stock and catalyst are passed either in countercurrent flow or in co-current flow; or in fluidized-solid processes in which the charge stock is passed upward through a turbulent bed of finely divided catalyst; or in the suspensoid process, in which the catalyst is slurried in the charge stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

A Group VIII metallic component and a Group VI-B metallic component are essential components of the catalyst of the present invention. Thus, the catalytic composite may contain metallic components from the group of molybdenum, tungsten, chromium, iron, cobalt, nickel, platinum, palladium, iridium, osmium, rhodium, ruthenium, and mixtures thereof. The concentration of the catalytically active metallic components is primarily dependent upon the particular metals as well as the physical and chemical characteristics of the charge stock. For example, the metallic components from Group VI-B are preferably present in an amount within the range of from about 0.01 percent to about 20 percent by weight, the iron-group metals in an amount within the range of from about 0.01 percent to about 10 percent by weight, whereas the platinum-group metals are preferred to be present in an amount within the range of from about 0.01 percent to about 5 percent by weight, all of which are calculated as if the metallic component existed within the finished catalytic composite as the elemental metal. For example, an alumina-silica composite containing about 63 weight percent of alumina is prepared by the well known co-precipitation of the respective hydrosols into spherical form. The co-precipitate material, generally in the form of a hydrogel, is dried at a temperature of about 100°C. for a time sufficiently long to remove substantially all of the physically-held water. The composite is then subjected to a high-temperature calcination technique in an atmosphere of air, for a period of about 1 hour at a temperature above about 300°C. which technique serves to remove the greater proportion of chemically-bound water. The calcined carrier material may be combined with the catalytically active metallic components in any suitable manner such as ion-exchange and/or impregnation with a suitable solution of the metallic components. Accordingly, the preferred method of preparing a dual-function catalyst comprising a metallic component combined with an alumina-silica support prepared by the method outlined above involves the utilization of water soluble compounds of the metallic component to impregnate the calcined support material.

Another essential component of the catalyst of the present invention is a fluoride. Although the precise form of the chemistry of the association of the fluoride with the alumina-silica support is not entirely known, it is customary in the art to refer to the fluoride as being combined with the support, or with the other ingredients of the catalyst. I have discovered that a superior catalyst is produced by the addition of the fluoride after the Group VIII and Group VI-B metallic components have been deposited on the alumina-silica support. It is believed that the support and the metallic ingredients compete for the fluoride and since the support has the capacity to associate with a greater share of the fluoride than the metallic component, the metallic components must therefore be present during the fluoride impregnation in order to successfully acquire associated fluoride. Furthermore, it is hypothesized that the support material, the metallic components and the fluoride are associated in a particular manner when combined according to the present invention, which manner is manifested and characterized by the fact that a superior hydrocarbon conversion catalyst is produced.

Regardless of the details of how the metallic component of the catalyst is combined with the catalyst, the resulting dual-function catalyst generally will be dried at a temperature of from about 200°F. to about 600°F. for a period of from about 2 to 24 hours or more and finally calcined at a temperature of about 700°F. to about 1100°F. for a period of about 0.5 to about 10 hours, and preferably 1 to about 5 hours.

It is preferred that the resultant calcined dualfunction catalytic composite be subjected to reduction conditions prior to its use in the conversion of hydrocarbons. This step is designed to insure a uniform and finely divided dispersion of the metallic component throughout the carrier material. Preferably, substantially pure and dry hydrogen is used as the reducing agent in this step. The reducing agent is contacted with the calcined catalyst at a temperature of about 800°F. to about 1200°F. and for a period of time of about 0.5 to 10 hours or more.

Although it is not essential, the resulting reduced dual-function catalyst is preferably subjected to a presulfiding operation designed to incorporate in the catalytic composite from about 0.05 to about 0.50 weight percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally including a temperature ranging from about 50°F. to about 1100°F. or more.

The conditions utilized in the numerous hydrocarbon conversion embodiments of the present invention are those customarily used in the art for the particular reaction, or combination of reactions, that is to be effected. For instance, alkylaromatic isomerization conditions include: a temperature of about 32°F. to about 1000°F.; a pressure at atmospheric to about 1500 psig.; hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.5 hr.$^{-1}$ to 20 hr.$^{-1}$. Typical alkylation conditions comprise: a temperature of about 32°F. to 800°F., a pressure of about atmospheric to about 2000 psig., a LHSV of about 1 to 20 hr.$^{-1}$. Likewise, typical hydrocracking conditions include: a pressure of about 400 psig. to about 3000 psig.; a temperature of about 400°F. to about 900°F.; a LHSV of about 0.1 hr.$^{-1}$ to about 10 hr.$^{-1}$; and hydrogen circulation rates of about 1000 to about 15,000 s.c.f. per barrel of charge.

The following examples are given to illustrate further the preparation of the catalytic composite of the present invention and the use thereof in the conversion of hydrocarbons. It is understood that the examples are given for the sole purpose of illustration and are not to be considered to limit unduly the generally broad scope and spirit of the appended claims.

EXAMPLE I

The catalyst of this example was selected to be used as a reference catalyst. The reference catalyst was prepared by impregnating a batch of 1/16 inch diameter spherical support material which contained 67 weight percent alumina and 33 weight percent silica with an aqueous impregnating solution containing molybdic acid, nickelous nitrate hexahydrate and ammonia. The concentration of the metal salts was selected to provide a finished catalyst containing 2 weight percent nickel and 16 weight percent molybdenum. After impregnation and drying in a rotary drier, the catalyst was calcined for one hour at 1100°F. The resulting catalyst had an apparent bulk density of 0.67.

A portion of the above-mentioned reference catalyst was subjected to an evaluation test whih consists of charging a vacuum gas oil having the properties shown in Table I to a hydrocracking catalytic reaction zone containing said catalyst at conditions including a LHSV of 0.8 hr.$^{-1}$, a hydrogen circulation rate of 12,000 SCFB, a pressure of 1500 psig. and a catalyst inlet temperature of 750°F.

TABLE I

| Properties of Vacuum Gas Oil | |
|---|---|
| API° Gravity at 60°F. | 20.1 |
| ASTM Distillation D-158: | |
| IBP, °F. | 640 |
| 10%, °F. | 720 |
| 50%, °F. | 815 |
| 90%, °F. | 909 |
| 95%, °F. | 925 |
| EBP, °F. | 955 |
| Total Sulfur, wt. % | 2.76 |
| Total Nitrogen, wt. % | 0.147 |
| Molecular Weight | 377 |
| Pour Point, °F. | 95 |
| Conradson Carbon, wt. % | 0.26 |
| Heptane Insolubles, wt. % | 0.07 |

The reactor effluent was separated to yield a normally gaseous stream, rich in hydrogen and a normally liquid stream. The latter stream was fractionated to yield a naphtha fraction defined as the hydrocarbons boiling between 80° and 300°F. and a kerosene fraction defined as the hydrocarbons boiling between 300° and 550°F. On a once through basis, the naphtha and kerosene yields were 5.0 and 30.0 liquid volume percent of the charge stock, respectively. The total reactor effluent product contained 250 ppm. sulfur and 19 ppm. nitrogen. This example demonstrates the catalytic ability of a good hydrocracking catalyst which contains no fluoride.

EXAMPLE II

Seventy-five grams of the reference catalyst described in Example I were impregnated with aqueous hydrofluoric acid solution (2.25 g.HF). The solution was poured over the spheres and was gently agitated for 30 minutes. The solution was then drained from the spheres which were then dried for 1 hour at 225°F. and calcined in a furnace for thirty minutes at 550°F. and an additional hour at 1100°F. The apparent bulk density of the finished catalyst was 0.72.

A portion of said catalyst was subjected to an evaluation test which was identical to that of Example I. The naphtha and kerosene yields were 9.0 and 41.0 liquid volume percent of the charge stock, respectively. The total reactor effluent product contained 80 ppm. sulfur and 2 ppm. nitrogen. The addition of fluoride as hydrogen fluoride to the reference catalyst of Example I increased the kerosene (jet fuel) yields by nearly 38%, improved sulfur removal fourfold and nitrogen removal over ninefold.

EXAMPLE III

One-hundred and nine grams of 1/16 inch diameter spherical support material which contained 67 weight percent alumina and 33 weight percent silica were impregnated in a rotary drier with a solution made by dissolving 43.93 g. of 85% molybdic acid in 176 cc. of 13% ammonia, to which was added 14.67 g. of nickelous nitrate dissolved in 15 cc. of 28% ammonia, to which was added 6.83 g. of 48% aqueous hydrofluoric acid. After impregnation and drying in the rotary drier, the catalyst was calcined for 30 minutes at 500°F. and then for an additional hour at 1100°F. The finished catalyst contained 2.3 weight percent nickel, 16 weight percent molybdenum and 2 weight percent fluorine, calculated as if the components existed in the elemental state, and had an apparent bulk density of 0.648.

A portion of said catalyst was subjected to an evaluation test which was identical to that of Examples I and II. As a result of the test, it was discovered that the naphtha yield was 4 liquid volume percent and the kerosene yield was only 22.5 liquid volume percent of the charge stock. The residual sulfur and nitrogen in the total reactor effluent product was 260 ppm. and 14 ppm., respectively.

The hydrocarbon conversion capabilities of this catalyst which was made by co-impregnation of the support with the nickel, molybdenum and fluoride components are vastly inferior to those of the catalyst prepared according to the present invention. According to the prior art, such results are absolutely unexpected since the catalysts of Example II and Example III contain identical quantities of the same components.

EXAMPLE IV

One-hundred and nine grams of 1/16 inch diameter spherical support material which contained 67 weight percent alumina and 33 weight percent silica were impregnated with an aqueous hydrofluoric acid solution (2.86 g. HF). The solution was then drained from the spheres and the spheres were dried for one hour at 225°F. and then calcined in a muffle furnace for 30 minutes at 500°F. and for 1 hour at 1100°F. The fluorided spheres were then placed in a rotary drier with a solution containing 40.25 g. of 85% molybdic acid dissolved in 127 cc. of 6.6% ammonia and to which was added 14.21 g. of nickelous nitrate hexahydrate dissolved in 19 cc. of 28% ammonia. After impregnation and drying in the rotary drier, the catalyst was calcined for 30 minutes at 500°F. and for 1 hour at 1100°F. The finished catalyst contained 2.9 weight percent nickel, 18 weight percent molybdenum and 1.8 weight percent fluorine, calculated on an elemental basis, and had an apparent bulk density of 0.652.

After a portion of said catalyst was subjected to the same evaluation test used in all of the previous examples, it was discovered that the naphtha yield was 5 liquid volume percent and the kerosene yield was 26.5 liquid volume percent while the residual sulfur and nitrogen in the total reactor effluent product was 280 ppm. and 16 ppm., respectively.

The results of the standard performance tests conducted with catalysts prepared according to the examples are tabulated in Table II below.

TABLE II

| Results Of Comparison Tests | Example I | Example II | Example III | Example IV |
|---|---|---|---|---|
| Kerosene Yield, LV% | 30 | 41 | 22.5 | 26.5 |
| Naphtha Yield, LV% | 5 | 9 | 4 | 5 |
| Residual Sulfur, wt. ppm. | 250 | 80 | 260 | 280 |
| Residual Nitrogen, wt. ppm. | 19 | 2 | 14 | 16 |

From these results, it is evident that the catalyst of the present invention (i.e., Example II) produced 41 liquid volume percent of kerosene from a vacuum gas oil which stands in sharp contrast to the other comparison catalysts which were not prepared according to the teachings of the present invention.

I claim as my invention:

1. A process for the hydrocracking of a hydrocarbon at a pressure of about 400 psig. to about 3000 psig.; a temperature of about 400°F. to about 900°F.; a LHSV of about 0.1 hr.$^{-1}$ to about 10 hr.$^{-1}$; and hydrogen circulation rates of about 1000 to about 15,000 s.c.f. per barrel of charge which comprises contacting the hydrocarbon with a catalyst consisting essentially of an alumina-silica support containing from about 10 weight percent to about 90 weight percent alumina, a Group VIII metallic component present in an amount of from about 0.01 percent to about 10 percent by weight of said catalyst, a Group VI-B metallic component present in an amount of from about 0.01 percent to about 20 percent by weight of said catalyst and a fluoride, said composition having been prepared by initially impregnating said support with a Group VIII metal compound and a Group VI-B metal compound, drying at a temperature of from about 200°F to about 600°F and calcining at a temperature of about 700°F to about 1100°F for a period of about 0.5 to about 10 hours the resultant impregnated composite and then impregnating said composite with aqueous hydrofluoric acid solution to associate said fluoride with said catalyst, followed by further calcining, said catalyst having a surface area of from about 50 to about 700 square meters per gram, a pore diameter of about 20 to about 300 Angstroms, and an apparent bulk density within the range of from about 0.10 to about 0.30 gram/cc.

2. The process of claim 1 further characterized in that said hydrocarbon is gas oil or vacuum gas oil.

3. The process of claim 1 further characterized in that the production of a kerosene fraction is maximized.

* * * * *